United States Patent [19]

Ohsawa

[11] 4,121,282
[45] Oct. 17, 1978

[54] POWER SUPPLY CIRCUIT

[75] Inventor: Mitsuo Ohsawa, Fujisawa, Japan

[73] Assignee: Sony Corporation, Tokyo, Japan

[21] Appl. No.: 759,650

[22] Filed: Jan. 17, 1977

[30] Foreign Application Priority Data

Jan. 21, 1976 [JP] Japan .................. 51-6129
Jan. 21, 1976 [JP] Japan .................. 51-6130

[51] Int. Cl.² .......................................... H02M 3/335
[52] U.S. Cl. ...................................... 363/21; 363/37;
363/41; 363/124
[58] Field of Search ................................ 363/18–21,
363/26, 34, 37, 41, 49, 97, 124

[56] References Cited

U.S. PATENT DOCUMENTS

| 2,922,958 | 1/1960 | Dean | 363/49 X |
|---|---|---|---|
| 3,349,311 | 10/1967 | Dudley | 363/49 X |
| 3,373,334 | 3/1968 | Geisz et al. | 363/26 |
| 3,514,688 | 5/1970 | Martin | 363/20 X |
| 3,816,809 | 6/1974 | Kuster | 363/97 X |
| 3,909,696 | 9/1975 | Katou et al. | 363/21 |
| 4,005,351 | 1/1977 | Blum | 363/21 X |
| 4,020,408 | 4/1977 | Grant | 363/21 |
| 4,031,453 | 6/1977 | Teuling | 363/20 |
| 4,037,271 | 7/1977 | Keller | 363/21 |

Primary Examiner—William M. Shoop
Attorney, Agent, or Firm—Lewis H. Eslinger; Alvin Sinderbrand

[57] ABSTRACT

In a power supply circuit of the type including a first rectifier to be connected to an AC power source through a power switch, a transformer with primary and secondary windings, a second rectifier connected to the secondary winding of the transformer to provide a desired DC output voltage, a pulse width modulated signal producing circuit, and a transistor connected to the primary winding of the transformer to be supplied with the pulse width modulated signal so as to chop the direct current flowing through the transformer; there is further provided an oscillation circuit connected to the primary winding of the transformer for generating an oscillation signal for a predetermined period following closing of the power switch, and a third rectifier for producing a DC voltage in response to such oscillation signal, with the DC voltage from the third rectifier being supplied to the pulse width modulated signal producing circuit as an operating voltage therefor.

7 Claims, 4 Drawing Figures

POWER SUPPLY CIRCUIT

BACKGROUND OF THE INVENTION

1. Field of the Invention

This invention relates generally to power supply circuits and more particularly is directed to improvements in a power supply circuit of the type in which a switching element is pulse-width modulated.

2. Description of the Prior Art

In the prior art, it has been proposed to employ a chopper system as a kind of power supply circuit. This prior art power supply circuit employing a chopper system generally comprises a power switch connected to a commercial power source, a power source filter, a full-wave rectifier, means for chopping the output from the rectifier, a transformer and a rectifier. More particularly, the DC voltage from the full-wave rectifier is supplied to a series connection of the primary winding of the transformer and a transistor for chopping or switching, and a PWM (pulse width modulated) pulse from a PWM modulator is supplied to the transistor to switch it ON and OFF. Thus, an AC voltage is induced on the secondary winding of the transformer, and such AC voltage is fed to the rectifier to be rectified as a desired DC voltage which is delivered to an output terminal. In order to stabilize the output DC voltage delivered to the output terminal, the output DC voltage is fed through a variable resistor to a transistor which compares the output DC voltage with a reference voltage from a constant voltage diode. The compared output is supplied, for example, through a photo-coupler and an amplifier, to a modulator for modulating a carrier received from an oscillator. Thus, the pulse width of the PWM pulse from the modulator is varied in response to the DC voltage at the output terminal and hence the DC voltage at the output terminal is stabilized at a constant value. Further, during operation of the power supply circuit, a DC voltage from the full-wave rectifier is fed through a transistor to the modulator and associated amplifier and oscillator as the operating voltage therefor.

With the above described power supply circuit employing a chopper system, the input AC side and the load side are separated with each other by the transformer and photo-coupler. Moreover, since the transistor carries out the switching operation, the power supply circuit theoretically has a high efficiency.

In practice, however, when the commercial AC voltage is 100 V, the DC voltage from the full-wave rectifier is about 140 V, whereas the operating voltage of the modulator and associated amplifier and oscillator is about 6 to 15 V. Accordingly, it is necessary that the DC voltage from the full-wave rectifier be dropped to the level required for the operating voltage, for example, by a transistor, resistor and so on, so that the actual efficiency of the power supply circuit is reduced. Further, the transistor employed has to be capable of withstanding a high voltage with the result that the reliability of the circuit is lowered and the circuit becomes expensive.

In order to avoid the above problems, it has been proposed to add a tertiary winding to the transformer, and to feed an AC voltage induced across the tertiary winding to a rectifier for producing a relatively low DC voltage as the operating voltage for the modulator and associated amplifier and oscillator.

However, in the last described power supply circuit, when the power switch is initially turned ON, the chopping transistor is OFF and hence the rectifier connected to the tertiary winding produces no DC voltage. Thus, the modulator and associated amplifier and oscillator are inoperative, and the modulator produces no PWM pulse so that the chopping transistor is maintained in its OFF-state. In other words, even if the power switch is turned ON, the power supply circuit as so far described is not made operative.

In order to solve that problem, the existing power supply circuit is provided with a start circuit to supply the DC voltage from the full-wave rectifier to the modulator and associated amplifier and oscillator as the operating voltage thereof for several seconds from the time when the power switch is first turned ON. However, due to the need for the start circuit, the existing power supply circuit is relatively expensive.

OBJECTS AND SUMMARY OF THE INVENTION

Accordingly, it is an object of the present invention to provide a power supply circuit employing a chopper system and which avoids the foregoing problems associated with known power supply circuits of that type.

More particularly, it is an object of this invention to provide a power supply circuit having a chopping transistor normally controlled by a PWM pulse from a modulator for stabilizing the DC output voltage of the circuit, and in which an improved circuit arrangement is provided for initiating the operation of such modulator when the power supply circuit is first supplied with AC power.

Another object of the invention is to provide a power supply circuit, as aforesaid, in which an operating voltage for initial operation of the modulator is produced without using a resistor and the like so as to assure a high efficiency.

A further object is to provide a power supply circuit which will produce a stable DC voltage after a predetermined time period from the closure of a power switch.

A further object is to provide a power supply circuit in which the power for initially operating the modulator is produced with a simple circuit which operates positively.

A still further object is to provide a power supply circuit in which a chopping transistor has A-class bias applied thereto for a predetermined time period following the closure of a power switch and is made to oscillate with the oscillated output therefrom being employed for operating the modulator.

It is a still further object of the invention to provide a power supply circuit which includes means for stopping the operation of an oscillator at the conclusion of the predetermined time period.

It is yet another object of the invention to provide a power supply circuit in which a transistor for chopping and a transistor for oscillating are separately provided and, after a power switch is closed, the oscillating transistor is operated for only a predetermined time period and, thereafter, the chopping transistor is operated to facilitate the design of the circuit.

According to an aspect of the invention, a power supply circuit is provided with a first rectifying circuit for producing a first DC voltage when AC power is supplied thereto, a transformer having a primary winding connected to the first rectifying circuit and a secondary winding, a second rectifying circuit connected to the secondary winding so as to produce the desired DC output voltage is response to an AC voltage generated on said secondary winding, a detecting circuit for detecting the DC output voltage, a modulating circuit for generating a modulated signal in response to an output signal from the detecting circuit, a switching element, for example, in the form of a chopping transistor connected to the transformer and supplied with the modulated signal so as to chop the first DC voltage applied to the transformer, a third rectifying circuit, and an oscillation circuit connected to the transformer for generating an oscillation signal in the transformer which is supplied to the third rectifying circuit and converted to a third DC voltage acting as an operating voltage for the modulating circuit when AC power is initially supplied to the power supply circuit.

The above, and other objects, features and advantages of the invention, will become apparent from the following detailed description which is to be read in conjunction with the accompanying drawings.

DESCRIPTION OF THE PREFERRED EMBODIMENTS

Figure 1:
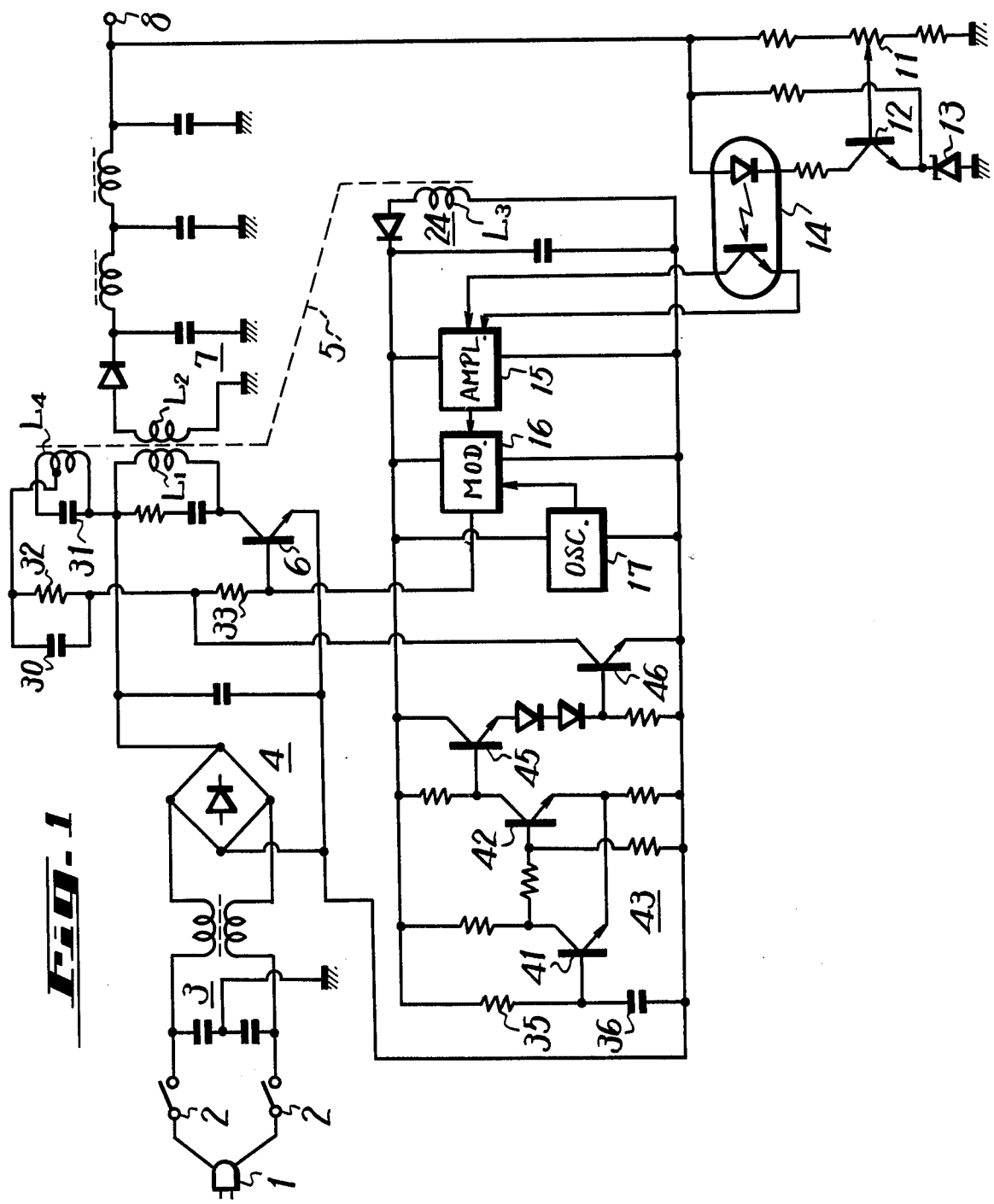
FIG. 1 is a circuit diagram showing an embodiment of a power supply circuit according to the invention.

Referring to the drawings in detail, and initially to FIG. 1 thereof, it will be seen that, in a power supply circuit of the type to which this invention is advantageously applied, a commercial AC voltage is supplied through a power plug 1, power switches 2 and a power filter 3 to a rectifying circuit or rectifier 4 which then rectifies and smoothes the AC voltage and produces a DC voltage. This DC voltage is applied to a series connection of the primary winding $L_1$ of a transformer 5 and the collector-emitter path of a switching or chopping transistor 6. The base of chopping transistor 6 is supplied with a PWM (pulse width modulated) pulse from, for example, a PWM modulating circuit or modulator 16 and hence is switched ON and OFF. Accordingly, an AC voltage is induced across a secondary winding $L_2$ of transformer 5 and such AC voltage is fed to a rectifying circuit or rectifier 7 to be rectified and smoothed for providing the desired DC output voltage at an output terminal 8.

In order to stabilize the DC output voltage at the terminal 8, the DC voltage at the terminal 8 is supplied through a variable resistor 11 to a transistor 12 which compares the DC voltage with a reference voltage from a constant voltage diode 13. The compared output from transistor 12 is fed through, for example, a photo-coupler 14 and an amplifier 15 to the modulator 16 as the modulation input of the latter. The modulator 16 is also supplied with a carrier from an oscillator 17, and such carrier has its pulse width modulated by the previously mentioned modulation input. Thus, the pulse width of the PWM pulse from the modulator 16 is varied in response to the DC output voltage at terminal 8, and hence the DC voltage at the terminal 8 is stabilized at a constant value.

The transformer 5 is further provided with a tertiary winding $L_3$ and an AC voltage induced thereacross is fed to a rectifying circuit or rectifier 24 which then produces a DC voltage. This DC voltage is supplied to the amplifier 15, modulator 16 and oscillator 17, respectively, as the operating voltage therefor.

The power supply circuit, to the extent described above, is well known in the prior art. As previously mentioned, when the power switches 2 are initially closed or turned ON, the chopping transistor 6 is OFF and, therefore, the rectifier 24 connected to tertiary transformer winding $L_3$ does not produce the necessary DC operating voltage for modulator 16 and the associated amplifier 15 and oscillator 17. Accordingly, no PWM pulse is applied to transistor 6 and the latter remains in its OFF state.

In the embodiment of the present invention shown on FIG. 1, the above problem is generally avoided by causing self-oscillation by transistor 6 for a predetermined period after closing of power switches 2 so that rectifier 24 can provide the necessary operating voltage for amplifier 15, modulator 16 and oscillator 17, with transistor 6 being returned to its normal chopping function at the conclusion of such predetermined period for stabilizing the DC output voltage at terminal 8. More particularly, in the embodiment shown on FIG. 1, transformer 5 has an additional oscillation winding $L_4$ connected in parallel with a capacitor 31 to provide a resonance circuit. One end of such parallel resonance circuit is connected to the output of rectifier 4. The oscillation winding $L_4$ is shown to have a tap which is connected to the base of transistor 6 through a parallel connection of a capacitor 30 with a resistor 32 which is connected in series with a resistor 33.

A series connection of a resistor 35 and a capacitor 36 is connected to the output side of the rectifier 24 as a time constant circuit. The connection point between resistor 35 and capacitor 36 is connected to the base of a transistor 41 which, together with a transistor 42, forms a schmidt circuit 43 for detecting or discriminating the voltage level. The collector of transistor 42 is connected through a transistor 45 to the base of a transistor 46 whose collector is connected to the connection point between the resistors 32 and 33.

With the power supply circuit shown in FIG. 1, at the instant when the power switches 2 are turned ON, the rectifier 24 does not produce any output voltage, so that transistor 45 is OFF and transistor 46 is also OFF. Accordingly, when the power switches 2 are turned ON, the DC voltage from rectifier 4 is applied through winding $L_4$ and resistors 32 and 33 to the base of the transistor 6 for applying A-class bias to the latter. In this case, capacitor 30 and resistor 33 act as a positive feedback from winding $L_4$ to the base of the transistor 6. Thus, an oscillation circuit is formed by transistor 6 and windings $L_1$ and $L_4$ and an oscillation is produced. The frequency of such oscillation is close to the chopping frequency of the transistor 6, for example, more than 20 $KH_z$.

In response to the above described oscillation, rectifier 24 produces an output voltage which charges capacitor 36 through resistor 35. Since transistor 41 remains OFF during the charging period of capacitor 36, transistor 42 is ON and, accordingly, transistors 45 and 46 are both OFF. Thus, transistor 6 continues its oscillation and the resulting DC output voltage from rectifier 24 is supplied to amplifier 15, modulator 16 and oscillator 17 as the operating voltage therefor.

When the voltage across capacitor 36 attains a certain value, that is, when a predetermined time period has elapsed after the power switches 2 are turned ON, transistor 41 is turned ON and, consequently, transistor 42 turns OFF. As a result, transistor 45 and transistor 46 are turned ON. When transistor 46 is turned ON, the bias current and oscillation feedback signal which were applied through resistors 32 and 33 to the base of the transistor 6 are cut off. However, at such time, amplifier 15, modulator 16 and oscillator 17 are already being supplied with the necessary operating voltage from rectifier 24, so that the transistor 6 carries out its chopping function with the PWM pulse from modulator 16. Thus, the stationary or stabilized state of the circuit is established thereafter.

As described above in the illustrated circuit according to the invention, when the power switches 2 are turned ON, the chopping transistor 6 initially achieves self-oscillation and thereafter, the power supply circuit achieves its stable or stationary state. Thus, the power supply circuit according to the invention avoids the lowering of its efficiency, and is simple in construction and hence inexpensive. Further, since the transistor 6 is kept in its self-oscillation state for a time interval after the switches 2 are turned ON determined by the time constant of resistor 35 and capacitor 36, the operating voltage can be positively applied to amplifier 15, modulator 16 and oscillator 17 at the start and, therefore, the modulator 16 can be driven positively.

In the embodiment of the invention described above with reference to FIG. 1, the oscillating circuit in which the transistor 6 is included is of the reverse-coupling type, but it will be understood that such an oscillating circuit may be of the blocking type.

Figure 2:
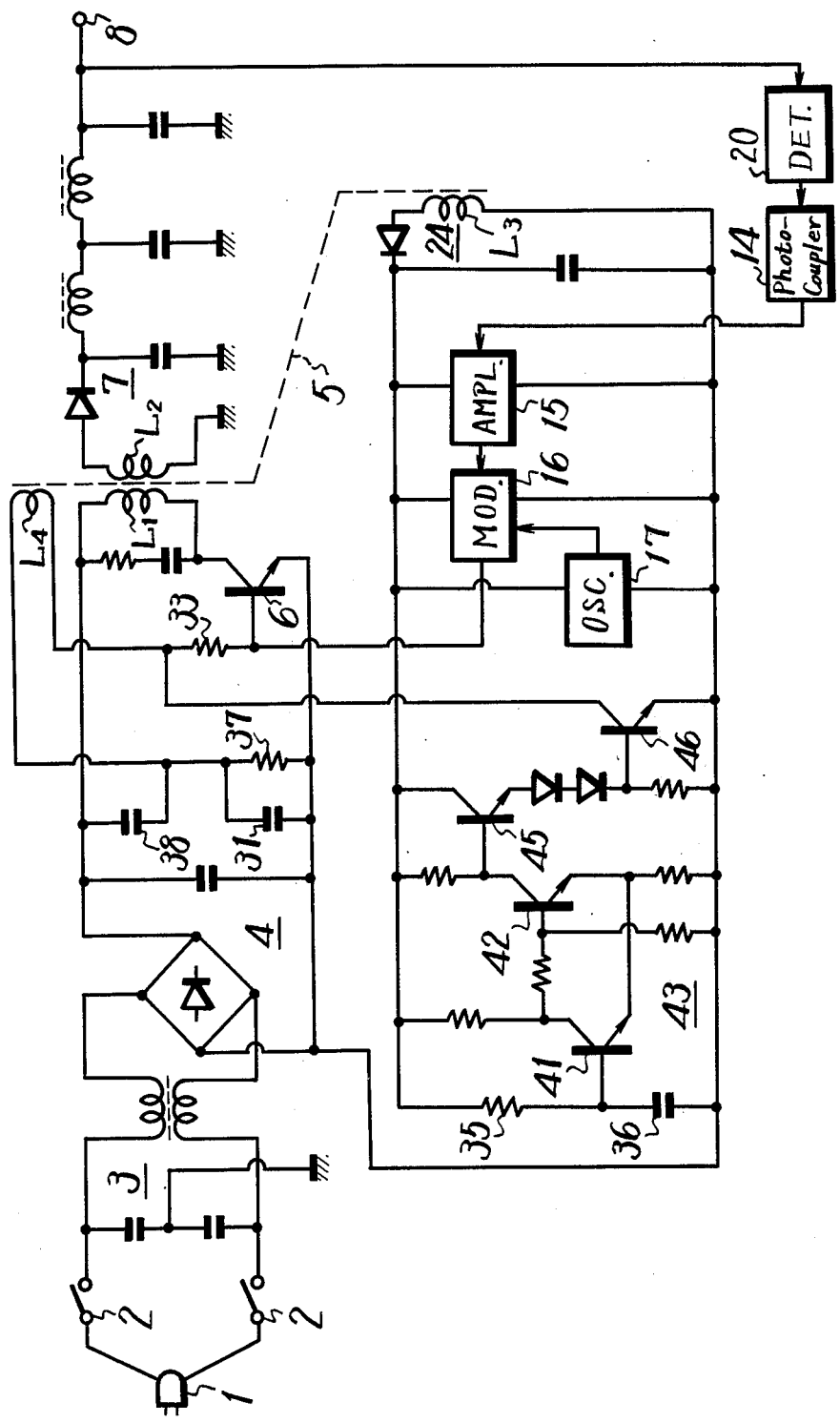
FIG. 2 is a circuit diagram showing another embodiment of the invention.

Referring now to FIG. 2, in which components of the illustrated power supply circuit corresponding to those described above with reference to FIG. 1 are identified by the same reference numerals, it will be seen that, in an embodiment of the invention having an oscillating circuit of the blocking type, one end of the additional transformer winding $L_4$ is connected to the base of transistor 6 through the resistor 33, while the other end of transformer winding $L_4$ is connected through a capacitor 38 with the output of rectifier 4 and also with a parallel connection of the capacitor 31 and a resistor 37. Further, on FIG. 2 a detector is indicated in block form by the reference numeral 20 for detecting the level of the DC output voltage at terminal 8, and it will be understood that such detector 20 may be comprised of the variable resistor 11, transistor 12 and constant voltage diode 13 described above with reference to FIG. 1.

In the power supply circuit of FIG. 2, when power switches 2 are turned ON, transistor 6 is triggered through capacitor 38, winding $L_4$ and resistor 33, and commences its self-oscillation at the frequency determined by the time constant of capacitor 31 and resistor 37. During such self-oscillation of transistor 6, rectifier 24 produces the necessary DC operating voltage for amplifier 15, modulator 16 and oscillator 17. After a predetermined time following the closing of power switches 2, transistor 46 is turned ON, as previously described, with the result that the feedback from winding $L_4$ to the base of transistor 6 is halted and, thereafter, transistor 6 performs its normal chopping function in response to the PWM pulse from modulator 16.

In each of the embodiments described above with reference to FIGS. 1 and 2, the transistor 6 which normally performs the chopping function is included in the oscillation circuit of the power supply circuit which is operative during the predetermined time period following closing or turning ON of power switches 2. However, as shown on FIG. 3, a power supply circuit according to this invention, may include an oscillation circuit 50 which does not include the chopping transistor 6 and which is associated with the additional transformer winding $L_4$ so as to be operated for a predetermined time period after the closing of power switches 2 for causing rectifier 24 to provide the necessary operating voltage for commencing the operation of amplifier 15, modulator 16 and oscillator 17. More particularly, as shown, the oscillation circuit 50 may include an oscillation transistor 51, a capacitor 52 connected in parallel with transformer winding $L_4$ to form a resonance circuit connected, at one end, to the output of rectifier 4 and, at its other end, to the collector of oscillation transistor 51. Further, a tap on transformer winding $L_4$ is connected through resistors 53 and 54, in series, to the base of transistor 51, and a capacitor 57 is connected in parallel with resistor 53. Finally, in the power supply circuit of FIG. 3 which is otherwise similar to the power supply circuits of FIGS. 1 and 2 and has its corresponding components identified by these same reference numerals, the collector of transistor 46 is connected to a junction point between resistors 53 and 54.

Figure 3:
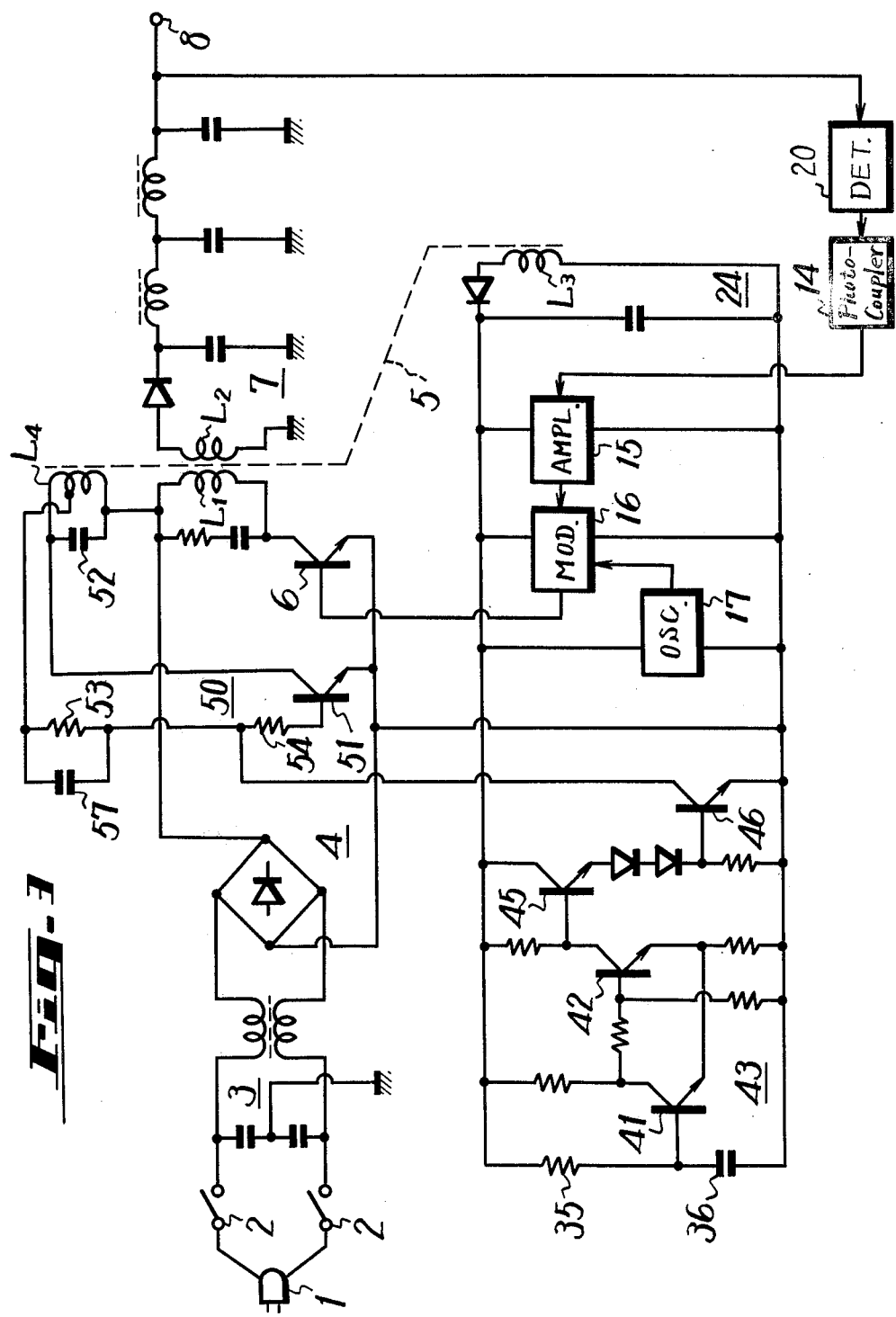
FIG. 3 is a circuit diagram showing a further embodiment of the invention.

As before, at the time the power switches 2 of the power supply circuit of FIG. 3 are initially turned ON, DC voltage is being obtained from rectifier 24 so that transistors 45 and 46 are OFF. Thus, upon closing of power switches 2, the output voltage from rectifier 4 is supplied through winding $L_4$ and resistors 53 and 54 to the base of transistor 51 for applying A-class bias to the latter. Further, capacitor 57 and resistor 54 form a positive feedback path from winding $L_4$ to the base of transistor 51 so long as transistor 46 is OFF, so that transistor 51 is made to oscillate. In response to such oscillation, an AC voltage is induced on winding $L_3$ so that rectifier 24 provides the necessary DC operating voltage for amplifier 15, modulator 16 and oscillator 17. Further, in response to the DC voltage produced by rectifier 24, capacitor 36 is charged through resistor 35. When the charge on capacitor 36 has attained a certain value, that is, at the end of a predetermined time period, transistor 41 is turned ON and, in response thereto, transistor 46 is turned ON. As a result of the ON state of transistor 46, the application of the bias current and oscillation feedback signal to the base of transistor 51 is terminated. By the time transistor 46 is turned ON, as aforesaid, amplifier 15, modulator 16 and oscillator 17 are already being operated normally by the operating voltage from rectifier 24, so that transistor 6 thereafter performs its normal chopping function to response to the PWM pulse from modulator 16 and the stable state of the power supply circuit is established.

In the power supply circuit described above with reference to FIG. 3, the oscillating circuit 50 independent of the chopping transistor 6 is of the reverse-coupling type. However, as shown on FIG. 4, a power supply circuit according to this invention may be similarly provided with an oscillating circuit 50A of the blocking type. More particularly, in the embodiment illustrated on FIG. 4, the oscillating circuit 50A is shown to comprise an oscillation transistor 51 having its collector-emitter path connected in parallel with the collector-emitter path of transistor 6. The base of transistor 51 is connected through a resistor 54 with one end of the additional transformer winding $L_4$ which has its other end connected through a capacitor 58 with the output of rectifier 4 and also connected to a time constant circuit constituted by a resistor 59 and capacitor 60.

Figure 4:
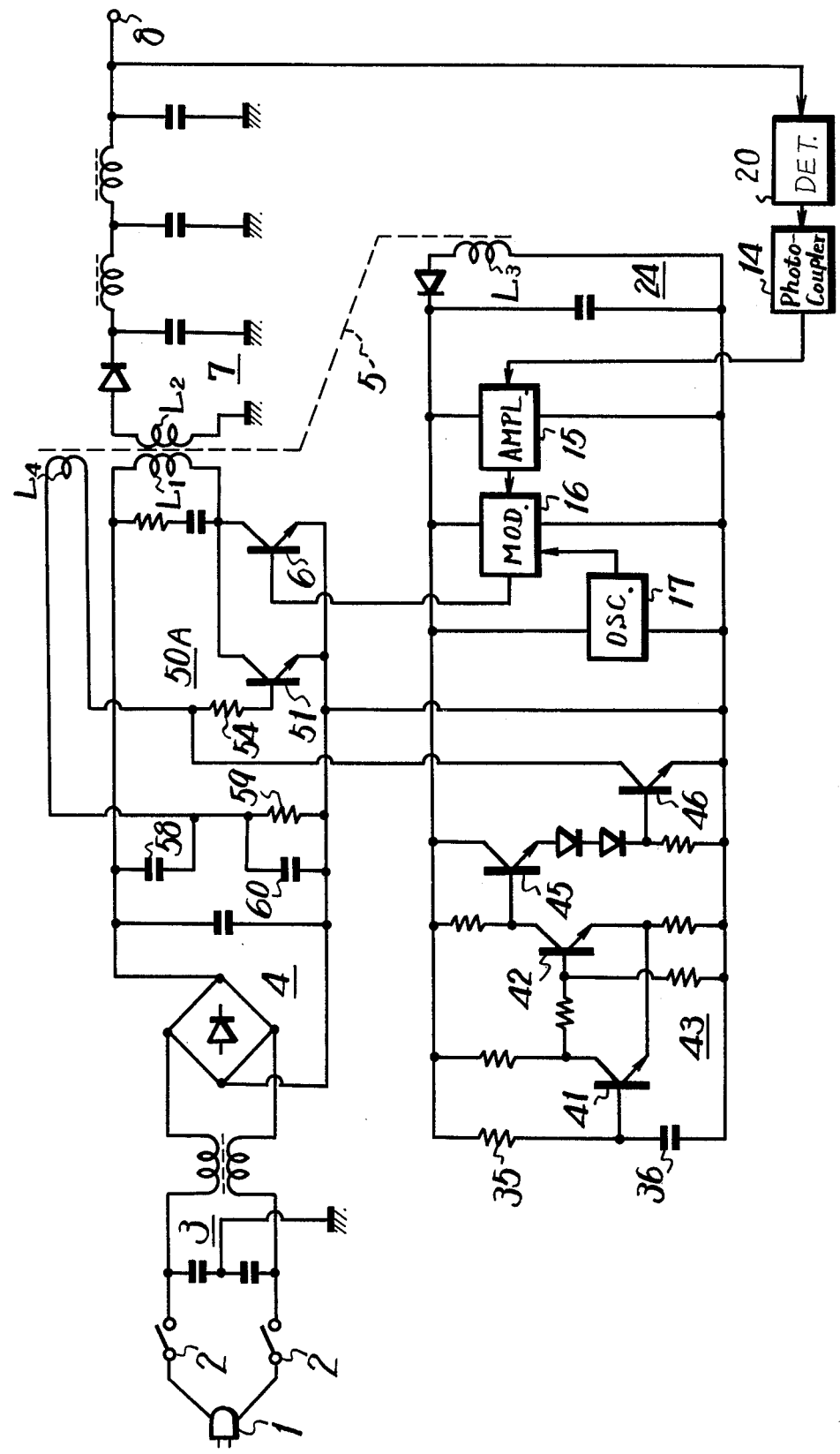
FIG. 4 is a circuit diagram showing a still further embodiment of the invention.

When power switches 2 of the power supply circuit shown on FIG. 4 are initially turned ON, oscillation transistor 51 is triggered with the output voltage of rectifier 4 through capacitor 58, winding $L_4$ and resistor 54 so as to initiate the self-oscillation of transistor 51 with the frequency of such self-oscillation being determined by the time constant of resistor 59 and capacitor 60. When transistor 46 is turned ON at the conclusion of a predetermined time interval, as in the previously described embodiments, the feedback from winding $L_4$ to the base of transistor 51 is terminated and, thereafter, transistor 6 carries out its normal chopping function in response to the PWM pulse from modulator 16.

It will be apparent that, in each of the above described power supply circuits according to this invention, the operating voltage for modulator 16 and the associated amplifier 15 and oscillator 17 is derived from the transformer winding $L_3$ and associated rectifier 24 both during start-up and normal operation of the power supply circuit so as to avoid the loss of efficiency that is encountered in the prior art when such operating voltage is derived from the rectifier 4 by way of suitable resistors for reducing the output voltage of rectifier 4 to the relatively low voltage required to operate amplifier 15, modulator 16 and oscillator 17. Further, during start-up of the described power supply circuits according to this invention, self-oscillation of either the chopping transistor 6 or the additional oscillation transistor 51 is positively effected for providing the DC voltage from rectifier 24 needed for commencing operation of amplifier 15, modulator 16 and oscillator 17 and ensuring the normal chopping operation of transistor 6 when transistor 46 is turned ON at a predetermined time following the initial closing of power switches 2. By reason of the foregoing, the power supply circuits according to this invention are positive in operation, reliable and relatively inexpensive.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention as described in the appended claims.

What is claimed is:

1. A power supply circuit comprising:
   a first rectifying circuit for producing a first DC voltage when AC power is supplied thereto;
   a transformer having primary, secondary, tertiary and fourth windings, said primary winding being connected to said first rectifying circuit;
   a second rectifying circuit connected to said secondary winding so as to produce a DC output voltage in response to an output voltage generated on said secondary winding;
   a detecting circuit for detecting said DC output voltage;
   modulating means for generating a modulated signal in response to an output signal of said detecting circuit;
   an active switching element connected in series with said primary winding of said transformer and controlled by said modulated signal so as to chop said first DC voltage applied to said transformer;
   an oscillation circuit connected to said fourth winding of said transformer and to said active switching element for generating an oscillation signal in said transformer, said oscillation circuit further including means for feeding back a signal produced in said fourth winding to said active switching element to cause self oscillation of the latter; and
   a third rectifying circuit connected to said tertiary winding of said transformer for receiving said oscillation signal and converting the same to a DC voltage which is supplied to said modulating means as an operating voltage thereof.

2. A power supply circuit according to claim 1; further comprising control means for causing operation of said oscillation circuit only for a predetermined time period following the commencement of the supplying of said AC power to the first rectifying circuit.

3. A power supply circuit according to claim 2; wherein said control means includes a time constant circuit connected to said third rectifying circuit, and means switched by an output from said time constant circuit for halting the feeding back of said signal from said fourth winding to said active switching element.

4. A power supply circuit according to claim 1; further comprising a time constant circuit connected to said third rectifying circuit to provide a predetermined output in response to the application of said DC voltage from said third rectifying circuit to said time constant circuit for a predetermined period of time during which said self-oscillation of the active element is effected, and means switched by said predetermined output of the time constant circuit to cut-off said feeding back of the signal from said fourth winding to said active element and thereby half said self-oscillation of the latter.

5. A power supply circuit according to claim 1; wherein said active switching element is a transistor; and further comprising a time constant circuit connected to said third rectifying circuit to provide a predetermined output in response to the application of said DC voltage from said third rectifying circuit to said time constant circuit for a predetermined period of time during which said self-oscillation of the active switching element is effected, and means switched by said predetermined output of the time constant circuit to cut-off said feeding back of the signal from said fourth winding to said transistor for halting said self-oscillation of the latter, whereupon said transistor is controlled by said modulated signal from said modulating means operated by said DC voltage from said third rectifying circuit.

6. A power supply circuit according to claim 1; wherein said oscillation circuit is of the reverse-coupling type.

7. A power supply circuit according to claim 1; wherein said oscillation circuit is of the blocking type.

* * * * *